(12) United States Patent
Kikuchi et al.

(10) Patent No.: US 7,530,709 B2
(45) Date of Patent: May 12, 2009

(54) ILLUMINATION APPARATUS HAVING A LIGHT-TRANSMITTING FRAME

(75) Inventors: Satoru Kikuchi, Akiruno (JP); Atsushi Nishida, Mitaka (JP)

(73) Assignee: Citizen Electronics Co., Ltd., Yamanashi (JP)

( * ) Notice: Subject to any disclaimer, the term of this patent is extended or adjusted under 35 U.S.C. 154(b) by 132 days.

(21) Appl. No.: 11/401,478

(22) Filed: Apr. 11, 2006

(65) Prior Publication Data

US 2006/0245194 A1 Nov. 2, 2006

(30) Foreign Application Priority Data

Apr. 14, 2005 (JP) .............................. P2005-117613

(51) Int. Cl.
*F21V 3/02* (2006.01)
(52) U.S. Cl. ...................... 362/231; 362/240; 362/311; 362/336; 362/522; 362/800
(58) Field of Classification Search ................ 362/231, 362/235, 555, 240, 311, 351, 360, 361, 363, 362/27, 24, 29, 30, 612, 551, 511, 522, 244, 362/309, 332, 336; 385/92–94
See application file for complete search history.

(56) References Cited

U.S. PATENT DOCUMENTS

| 3,875,456 | A | * | 4/1975 | Kano et al. ................. 313/501 |
| 5,349,504 | A | * | 9/1994 | Simms et al. ................ 362/555 |
| 5,836,676 | A | * | 11/1998 | Ando et al. .................. 362/244 |
| 6,523,976 | B1 | * | 2/2003 | Turnbull et al. ............. 362/231 |
| 6,578,979 | B2 | * | 6/2003 | Truttmann-Battig ......... 362/92 |
| 6,974,229 | B2 | * | 12/2005 | West et al. .................. 362/227 |
| 7,029,147 | B2 | * | 4/2006 | Nawashiro .................. 362/236 |
| 2002/0093832 | A1 | * | 7/2002 | Hamilton ..................... 362/555 |

FOREIGN PATENT DOCUMENTS

| JP | 2001-007405 A | 1/2001 |
| JP | 2004-023412 A | 1/2004 |
| JP | 2005-257953 A | 9/2005 |

\* cited by examiner

*Primary Examiner*—Jong-Suk (James) Lee
*Assistant Examiner*—Leah S Lovell
(74) *Attorney, Agent, or Firm*—Browdy and Neimark, PLLC

(57) ABSTRACT

A light emitting apparatus including a first light source, a second light source to emit light of a color different from that of the light emitted from the first light source, a frame configured to cover above the first light source and the second light source, and exit areas formed on the frame to correspond to the first light source and the second light source, respectively, the light emitted from each of the first light source and the second light source being emitted through the corresponding exit areas to the exterior of the frame.

11 Claims, 6 Drawing Sheets

ILLUMINATION APPARATUS HAVING A LIGHT-TRANSMITTING FRAME

CROSS-REFERENCE TO THE RELATED APPLICATION

This application is based on and claims priority from Japanese Patent Application No. 2005-117613, filed on Apr. 14, 2005, the disclosure of which is incorporated herein by reference in its entirety.

BACKGROUND OF THE INVENTION

1. Field of the Invention

The present invention relates to a light emitting apparatus installed in a small-scale electronic instrument such as a mobile phone with a camera, or the like.

2. Description of Related Art

Many recent mobile phones, in addition to containing a light emitting device used for photographing still or motion pictures, are also provided with a light emitting section configured to inform the user of incoming calls or mails and to indicate talking on phone by means of a flashing or lighting a single color of light or different-colored light. Also, in recent years, proposals have been made related to a stroboscopic mechanism to emit flash light for photography installed in mobile phones.

For the mobile phones provided with functions mentioned above, it is necessary to mount an LED for indication of incoming calls etc in a different place from the white LED for flash light.

An example of a known conventional mobile phone with a camera is shown in FIG. 11.

The mobile phone 71 as shown in FIG. 11 includes a case 72 having an upper case 72a and a lower case 72b and is of a folded type in which the case is folded into two. The upper case 72a is provided with a camera lens 74 for photography, a strobe-light emitting section 75 for emitting flash light, and a light emitting section 76 configured to inform the user of incoming calls etc.

Generally, a white LED is used as the flash light source in the strobe-light emitting section 75 and a blue LED is used as the indication light source in the light emitting section 76. Furthermore, a supplementary display section 77 having a screen which is located outside in the folded state and an antenna 78 for sending and receiving are provided on the upper case 72a (see FIG. 11).

Another example of a known conventional mobile phone with a camera is shown in FIG. 12 (see, for reference, Japanese Patent Laid-Open No. 2004-23412, pages 3 to 5, FIG. 1).

The mobile phone 80 as shown in FIG. 12 includes a photographic lens 81. A plurality of ring lights 84 are arranged peripherally of the photographic lens 81. The ring lights 84 comprise three-colored LEDs 82 which are arranged in a ring shape and which are configured to emit red light, blue light and green light. In this way, white light is acquired by emission of light of all three colors from the lighted LEDs 82. The emitted white light is used as a flash light for photography.

At the same time, it is possible to inform incoming calls etc. by blinking each selected color of the three-colored LEDs 82.

However, in the mobile phone 71 as shown in FIG. 11, because the strobe-light emitting section 75 and the light emitting section 76 are disposed independently at places separate from each other, a plurality of LEDs are required for each light source.

On the other hand, in the mobile phone 80 as shown in FIG. 12, because a plurality of LEDs, each of which emits either red light, blue light or green light are required, the number of LEDs increases and a large area is required for mounting the LEDs.

In this way, there are problems of large size, heavy weight and high cost for a mobile phone with multiple functions mentioned above.

SUMMARY OF THE INVENTION

An object of the present invention is to provide a light emitting apparatus used for multiple lighting functions of an electronic instrument such as a mobile phone achieving miniaturization, weight and cost reduction of the light emitting apparatus and the instrument in which the apparatus will be housed.

To accomplish the above object, a light emitting apparatus according to one embodiment of the present invention includes a substrate, a plurality of light sources mounted on the substrate and configured to emit light of different colors, respectively, and a frame mounted on the substrate to cover above the plurality of light sources.

The frame includes an incident area configured for input of each different colored light from the plurality of light sources and at least one exit area configured to emit the inputted light to the exterior of the frame.

In the light emitting apparatus as mentioned above, because light of different colors is emitted from the at least one exit area formed on the frame, a small-sized light emitting apparatus can be accomplished.

It is therefore possible to install the small-sized light emitting apparatus in compact form on any instrument. Consequently, when the light emitting apparatus according to the present invention is installed on a mobile electronic instrument such as a mobile phone with a camera, or the like, it is easy to achieve miniaturization of the light emitting apparatus and multiple functions, such as strobe-light emission, displays, and the like.

DETAILED DESCRIPTION OF THE PREFERRED EMBODIMENTS

Figure 1:
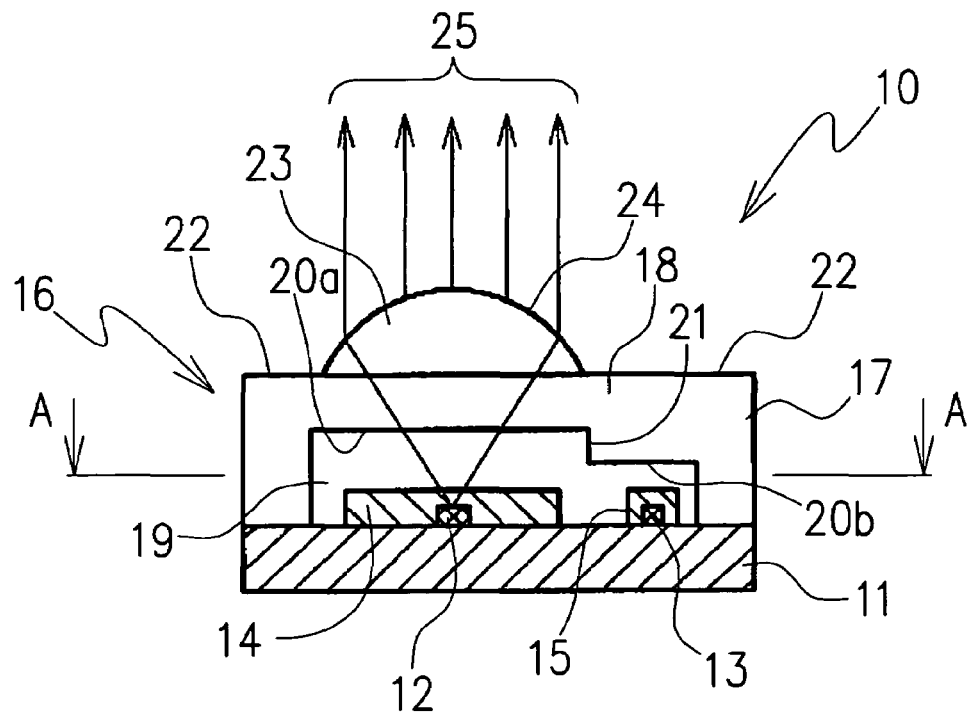
FIG. 1 is a sectional view showing a structure of a first embodiment of a light emitting apparatus according to the present invention and an optical path of light emitted from a first light source.

Preferred embodiments of the present invention will be explained in detail below with reference to the accompanying drawings.

FIGS. 1 to 4 illustrate a first embodiment of a light emitting apparatus according to the present invention. The light emitting apparatus 10 includes a substrate 11, at least one first light source 12 and at least one second light source 13 which are mounted on one surface of the substrate 11, a first resinous sealing body 14 to seal the first light source 12 and a second resinous sealing body 15 to seal the second light source 13, a frame 16 having a concave portion and attached to the substrate 11 to cover from above and contain the first resinous sealing body 14 for sealing the first light source 12 and the second resinous sealing body 15 for sealing the second light source 13 within the concave portion. Here, the substrate 11 has a square shape (see FIGS. 3 and 4) and the frame 16 has a same shape as the substrate 11 in plan view.

In this embodiment, the first light source 12 and the second light source 13 are set to emit light of different luminescent colors with respect to each other. For example, the first light source 12 may be a white light emitting diode (hereinafter, referred to as white LED) and the second light source 13 may be a blue light emitting diode (hereinafter, referred to as blue LED).

Figure 3:
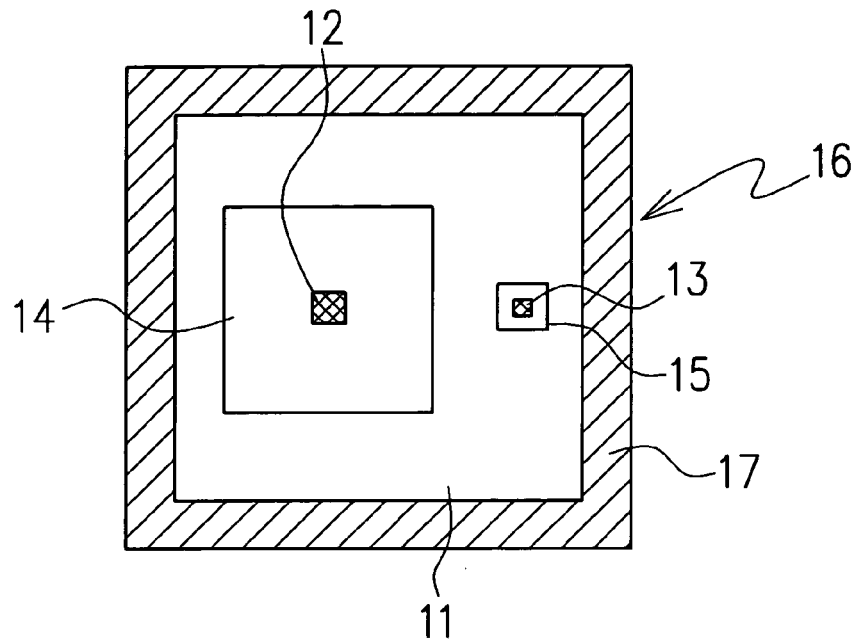
FIG. 3 is a sectional view taken along line A-A in FIG. 1.
Figure 4:
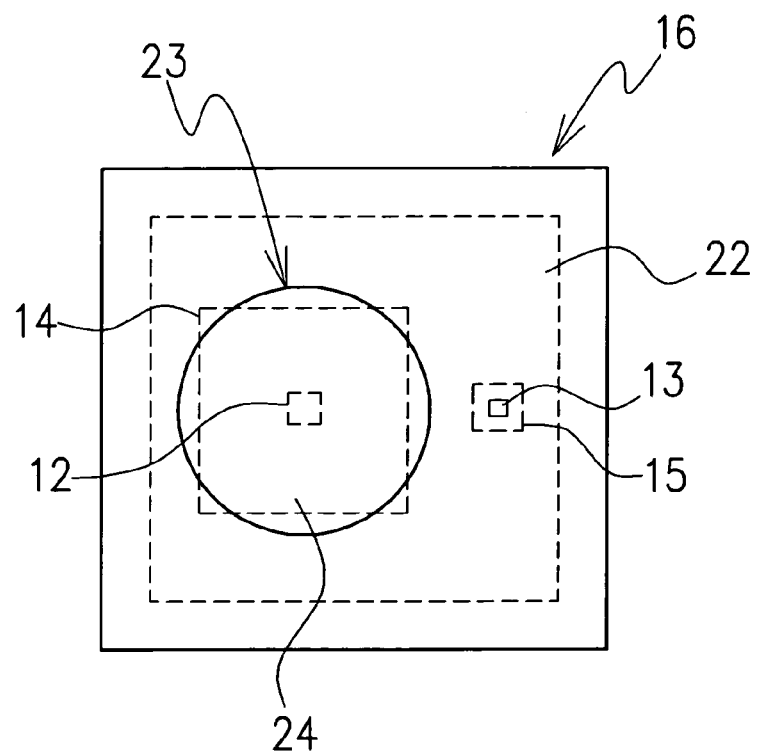
FIG. 4 is a plan view of the light emitting apparatus as shown in FIG. 1

One first light source 12 is disposed at a generally central portion of the substrate 11 and one second light source 13 is disposed laterally at a position away from the first light source 12 (see FIGS. 3 and 4). The first and second light sources 12 and 13 have upwardly directed emission surfaces and are mounted on the substrate 11. Here, openly available LEDs may be used for the white LED and the blue LED.

The frame 16 is made of translucent resin and includes a concave portion formed by a side wall 17 configured to surround the four sides of the substrate 11 (see FIG. 3), and an upper wall 18 configured to cover above the first and second light sources 12 and 13 to form an inner space 19 between the upper wall 18 and each of the first and second resinous sealing bodies 14 and 15. The inner space 19 in the concave portion is divided into a first space part formed between the first resinous sealing body 14 for sealing the first light source 12 and a first lower surface of the upper wall 18 and a second space part which is formed between the second resinous sealing body 15 for sealing the second light source 13 and a second lower surface of the upper wall 18.

Of course, if the light emitted from the side wall 17 is not needed, the frame 16 may be made of translucent resin at the upper wall 18 and the side wall 17 may be formed by a different material. If the side wall 17 has a reflection surface, light toward the side wall 17 will be reflected toward the upper wall. In this case, unnecessary light in lateral directions can be used effectively.

The first and second space parts in the concave portion have different ceiling heights. For example, the first space part has a ceiling height higher than that of the second space part. In other words, a stepped portion 21 is provided between a first lower surface 20a of the upper wall 18 above the first light source 12 and a second lower surface 20b of the upper wall 18 above the second light source 13.

In an example, the stepped portion 21 is formed so that an interval between the first lower surface 20a and the first light source 12, specifically, the first resinous sealing body 14 is larger than an interval between the second lower surface 20b and the second light source 13, specifically, the second resinous sealing body 15.

On the other hand, at least one exit area to emit light emitted from each of the first and the second light sources 12 and 13 is provided on an outside surface of the frame 16. For example, the exit area includes a semi-spherical convex lens portion 23 which is provided on an upper outside surface 22 of the upper wall 18 to face the first light source 12. The convex lens portion 23 is configured to have an optical axis corresponding generally to a center of the first light source 12 and a size in plan view corresponding generally to a size of the first resinous sealing body 14 in plan view, as shown in FIG. 4.

The convex lens portion 23 is also configured to emit white light 25 which is emitted from the first light source 12 and passes through the frame 16 made of translucent resin.

In the light emitting apparatus 10 having the above-mentioned structure, the first lower surface 20a of the upper wall 18 above the first light source 12 is a light incident surface of the white light 25 emitted from the white LED which is the first light source 12, and an outer surface 24 of the convex lens portion 23 facing the first lower surface 20a is a light exit surface, as shown in FIG. 1.

Figure 2:
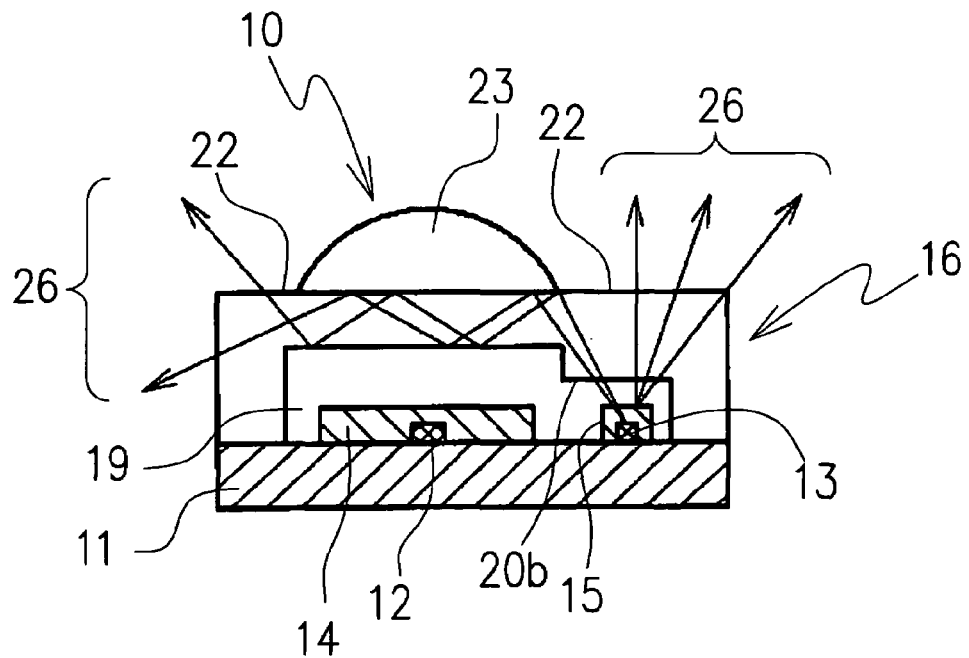
FIG. 2 is a sectional view showing the structure of the first embodiment of the light emitting apparatus according to the present invention and an optical path of light emitted from a second light source.

On the other hand, as shown in FIG. 2, the second lower surface 20b of the upper wall 18 above the second light source 13 is an incident surface of the blue light 26 emitted from the blue LED which is the second light source 13, and an outer side area outside of the convex lens portion 23 facing the second lower surface 20b, in other words, the upper surface 22 of the frame 16 excepting the convex lens portion 23 and an outer surface of the side wall 17 are light exit surfaces.

Here, a light incident area of the frame for receiving the white light and the blue light emitted from the first and second light sources comprise light incident surfaces such as first lower surface 20a and second lower surface 20b for the white light and the blue light, respectively.

The upper surface 22 of the frame 16 and the outer surface of the side wall 17 are configured to form an exit area for the blue light 26 emitted from the second light source 13.

In this way, by providing the first and second lower surfaces 20a and 20b which provide different ceiling heights and are separated by the stepped portion 21 on the upper wall 18 of the frame 16, it is possible to emit the white light 25 and the blue light 26 from different exit areas formed on the upper surface 22 of the frame 16, respectively.

Next, an optical path of the light emitted from each of the first and second light sources in the light emitting apparatus 10 is explained.

First of all, the white light 25 emitted from the first light source 12 enters the first lower surface 20a of the upper wall 18 of the frame 16 and passes through the upper wall 18, is then focused by the convex lens portion 23 and emitted from the outer surface 24 of the convex lens portion 23 upwardly in a state that maintains linear directionality, as shown in FIG. 1.

As the same time, the blue light 26 emitted from the second light source 13 enters the second lower surface 20b of the upper wall 18 of the frame 16.

A part of the blue light 26 entering the second lower surface 20b passes through the upper wall 18 to be emitted from the upper surface 22 of the upper wall 18 upwardly and the rest of the blue light 26 is transmitted within the inside of the upper wall 18 while undergoing repeated total reflection on the upper wall 18, and is then emitted from the upper surface 22 of the upper wall 18 and the outer surface of the side wall 17 to the exterior of the frame 16.

In this way, the blue light 26 emitted from the second light source 13 is emitted from the entire area of the upper surface 22 except for the convex lens portion 23 formed on the upper surface 22 of the upper wall 18 of the frame 16.

As mentioned above, the light emitting apparatus 10 in this embodiment is configured to have the first and second light sources 12 and 13 disposed in the frame 16, emit the white light 25 emitted from the first light source 12 through the convex lens portion 23 provided on the upper surface 22 of the frame 16 to the exterior of the frame 16, while, on the other hand, emitting the blue light 26 emitted from the second light source 13 through the area outside of the convex lens portion 23.

Here, a small amount of the blue light from the second light source 13 may be emitted through the convex lens portion 23. However, when the first and second light sources 12 and 13 are lighted together, the white light 25 from the first light source 12 mainly passes through the first lower surface 20a and is condensed at the convex lens portion 23 (see FIG. 1) because the convex lens portion 23 is disposed to face the first light source 12; in contrast, through the blue light 26 from the second light source 13 mainly passes through the second lower surface 20b to the exterior of the upper surface 22, a portion of the blue light 26 repeats reflecting within the frame and finally emits from the side wall 17 (see FIG. 2). Therefore, the white light 25 can be condensed enough for flash light and the blue light can illuminate the frame 16 in whole.

In this way, the light sources for different purposes are contained in a light emitting apparatus and partly share the configuration of the apparatus such as a substrate, frame and so on. As a result, reductions of parts, space and cost can be attained. In addition, it is possible to simplify the circuitry for the LEDs by incorporating an exclusive drive function to drive the white LED and the blue LED.

Figure 5:
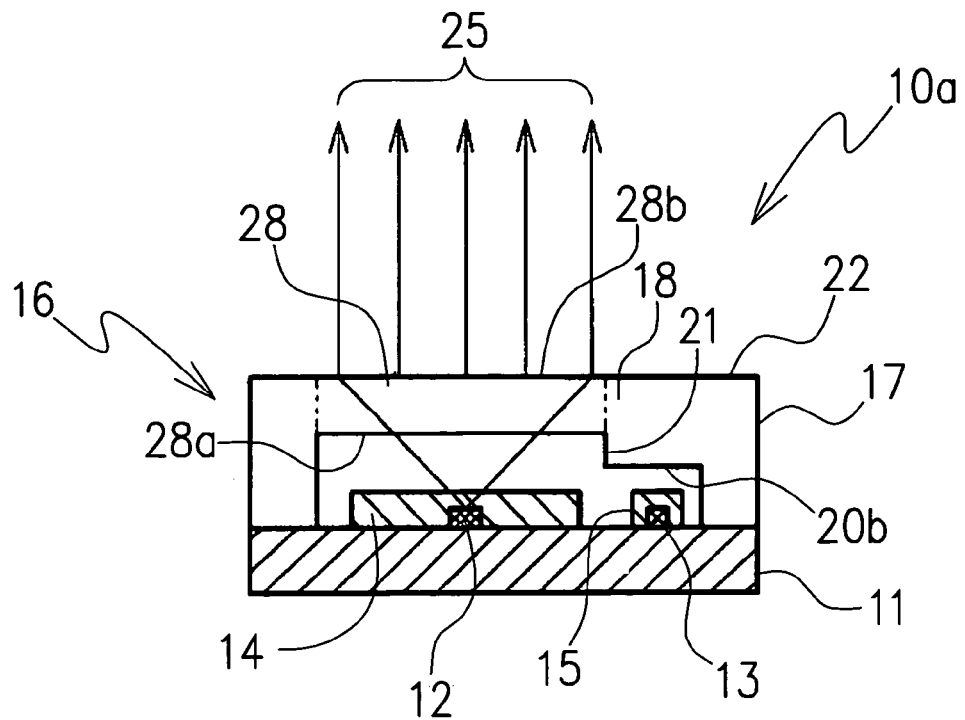
FIG. 5 is a sectional view showing a structure of a modified example of the light emitting apparatus in the first embodiment and an optical path of light emitted from a first light source.
Figure 6:
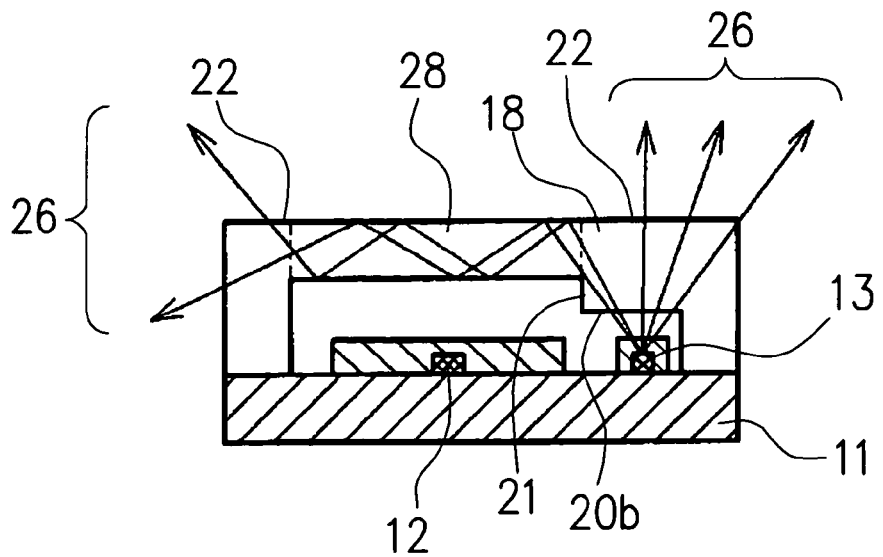
FIG. 6 is a sectional view showing the structure of the modified example of the light emitting apparatus in the first embodiment and an optical path of light emitted from a second light source.

FIGS. 5 and 6 illustrate a modified example of the light emitting apparatus 10 in the above-mentioned first embodiment. The modified light emitting apparatus is shown at 10a.

In the light emitting apparatus 10a in the modified example, instead of the convex lens portion 23 in the first embodiment, a planar lens portion 28 is provided on one portion of the upper wall 18 of the frame 16. More specifically, the planar lens portion 28 is disposed to face the first light source 12 and has a lower surface 28a which is an entrance surface for the white light 25 emitted from the first light source 12 and corresponds to the first lower surface 20a in the first embodiment. The planar lens portion 28 has an upper surface 28b which is an exit surface to emit the white light 25. The planar lens portion 28 is, for example, configured to be Fresnel lens. The Fresnel lens may be formed on an upper surface or/and a lower surface which face the first light source 12.

Because other aspects of the structure in the modified example are substantially the same as in the first embodiment, identical reference numbers are attached to similar parts and a detailed description thereof is omitted.

In the light emitting apparatus 10a having the above-mentioned structure, the white light 25 emitted from the first light source 12 enters the lower surface 28a of the planar lens portion 28, is condensed by the planar lens portion 28 and then emitted from the upper surface 28b of the planar lens portion 28 to the exterior of the frame 16, as shown in FIG. 5.

On the other hand, the blue light 26 emitted from the second light source 13 enters the second lower surface 20b of the upper wall 18 divided by a stepped portion 21, as shown in FIG. 6.

The blue light 26 entering the second lower surface 20b is guided in the upper wall 18 and mainly emitted through the upper surface 22 of the upper wall 18 which is an area outside of the planar lens portion 28 to the exterior of the frame 16. The rest of the blue light 26 transmits within the frame 16 while repeating total reflection in the upper wall 18 of the frame 16, and is then emitted from the upper surface 22 of the upper wall 18 and the outer surface of the side wall 17 to the exterior of the frame 16.

In this way, even in the light emitting apparatus 10a in the modified example, because the white light 25 emitted from the first light source 12 is condensed and emitted through the planar lens portion 28 and the blue light 26 emitted from the second light source 13 is emitted through the upper surface 22 of the upper wall 18, and the outer surface of the side wall 17 to the exterior of the frame 16, a similar effect to that of the light emitting apparatus 10 in the first embodiment can be obtained.

Figure 7:
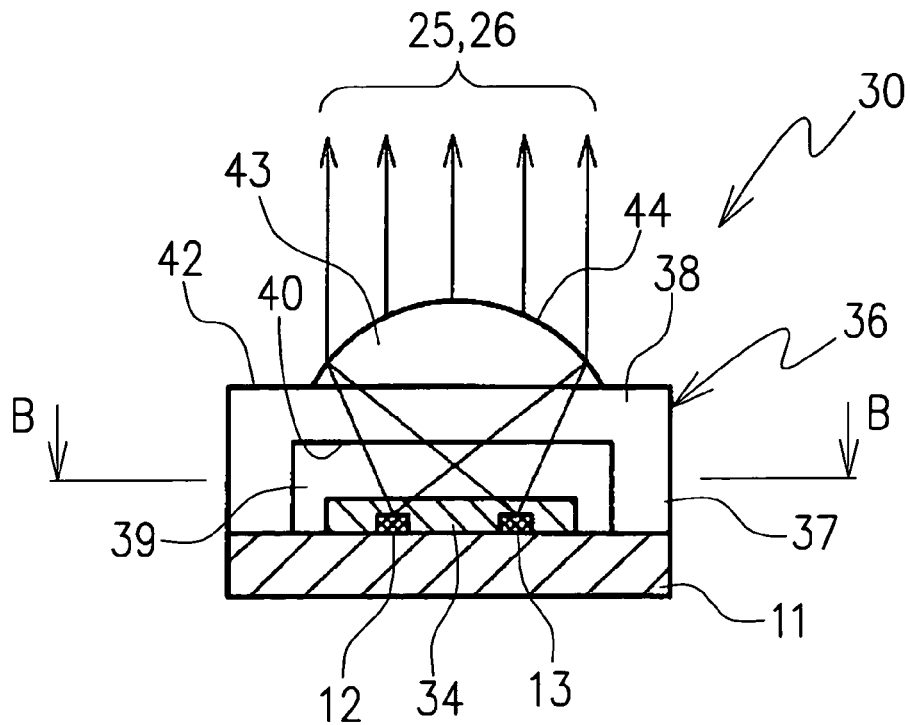
FIG. 7 is a sectional view showing a structure of a second embodiment of the light emitting apparatus according to the present invention and an optical path of light.
Figure 8:
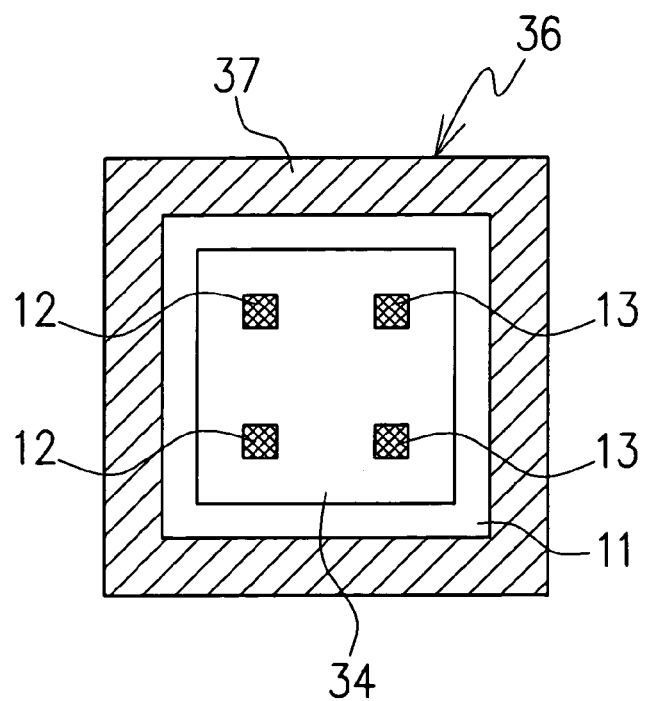
FIG. 8 is a sectional view taken along line B-B in FIG. 7.
Figure 9:
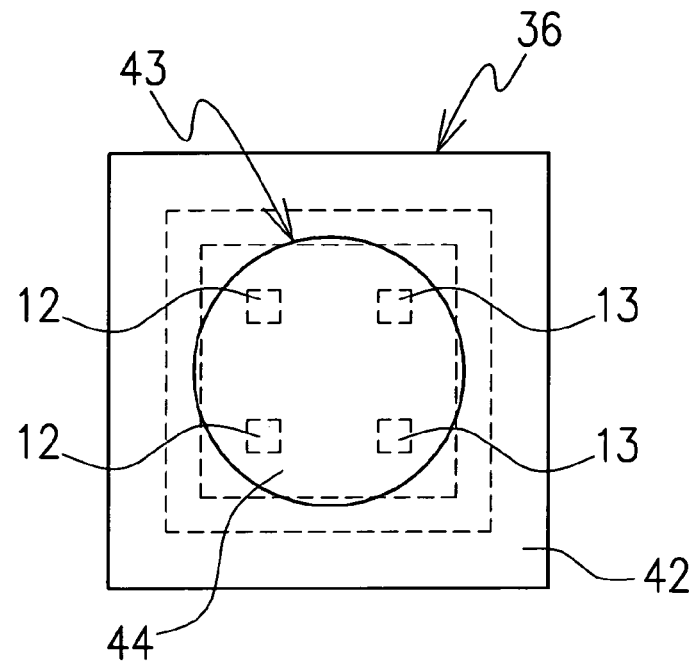
FIG. 9 is a plan view of the light emitting apparatus in the second embodiment.

FIGS. 7 to 9 illustrate a second embodiment of the light emitting apparatus according to the present invention.

The light emitting apparatus 30 in this embodiment includes a generally square substrate 11, a plurality of first light sources 12 and a plurality of second light sources 13. The first and second light sources 12 and 13 are mounted on the substrate 11. The two first light sources 12 and two second light sources 13 are arranged at equal intervals from a center of the substrate 11. These four light sources are sealed by a common resinous sealing body 34.

Further, in this embodiment, the first light sources 12 are both white LEDs and the second light sources 13 are both blue LEDs.

Similarly to the first embodiment, a frame 36 is provided on the substrate 11 to cover above the first and second light sources 12 and 13 and the resinous sealing body 34. The frame 36 is made of a translucent resinous material and formed with a side wall 37 to surround four sides of the substrate 11 and an upper wall 38 to cover above the resinous sealing body 34. Therefore, an inner space 39 is formed between the upper wall 38 and the resinous sealing body 34.

In addition, a convex lens portion 43 is provided on an upper surface 42 of the upper wall 38. The convex lens portion 43 has an optical center line disposed at a generally central position of the substrate 11 and a diameter substantially corresponding in size to a planar shape of the resinous sealing body 34.

As shown in FIG. 7, the convex lens portion 43 provided on the upper surface 42 of the upper wall 38 is a common exit area of the white light 25 emitted from the first light source 12 and the blue light 26 emitted from the second light source 13. Light emitted from an outer surface 44 of the convex lens portion 43 is emitted to the exterior of the frame 36 as light having upward directivity. In other words, the white light 25 and the blue light 26 enter a lower surface 40 of the upper wall 38, pass through the upper wall 38, and are thereafter condensed and emitted through the convex lens portion 43 provided on the upper surface 42 to the exterior of the frame.

Accordingly, it is possible to optionally emit either the white light 25 or blue light 26 from the convex lens portion 43 by switching a light emitting switch for the first and second light sources 12 and 13, and, in addition, it is also possible to emit a mixture of the white light 25 and the blue light 26.

In the second embodiment, because the first and second light sources 12 and 13 configured to emit light of the different colors can be disposed together in the common frame 36 in this way, the ratio of mounting space for the light emitting apparatus to the total size of the small-sized electronic instrument can be minimized, similarly to the first embodiment.

Moreover, when the light emitting apparatus 30 in the second embodiment is installed in a small-sized electronic instrument such as a mobile phone or the like, it is possible to achieve multiple functions such as strobe-light emission, indication light or the like as a single light emitting apparatus by emitting the white light 25 or the blue from the convex lens portion 43 provided on the frame 36. This enables to eliminate the plurality of light emitting apparatuses which have been conventionally used. Consequently, it is possible to acquire an extensive selection of designs for mobile phone cases and achieve miniaturization, weight saving, low cost and so on of the cases.

Figure 10:
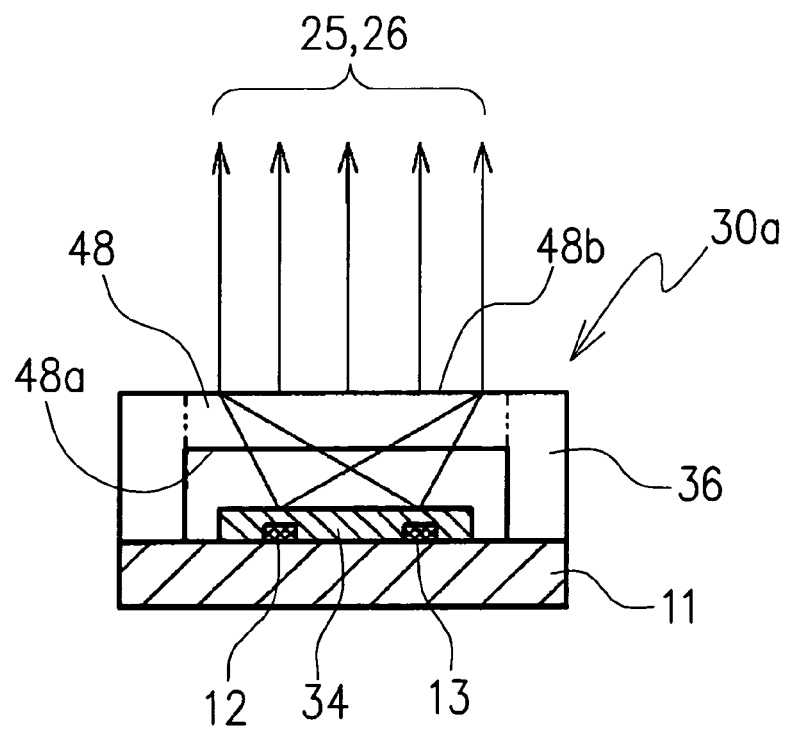
FIG. 10 is a sectional view showing a structure of a modified example of the light emitting apparatus in the second embodiment and an optical path of light.
Figure 11:
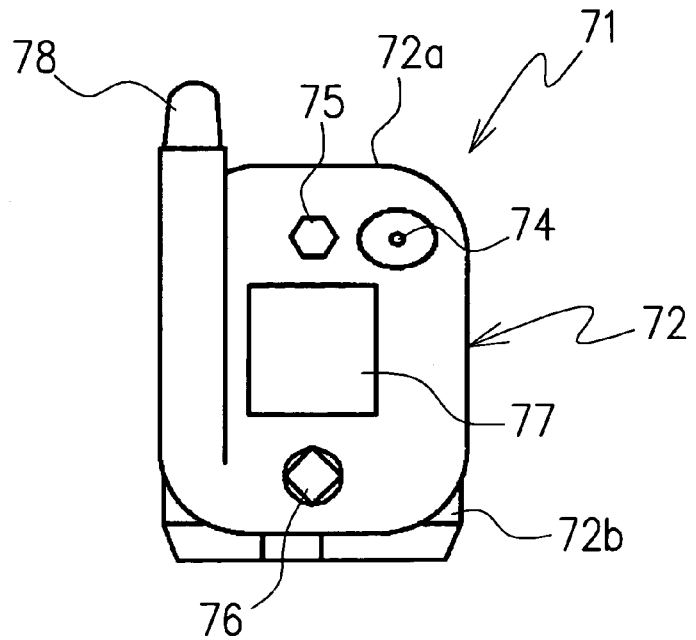
FIG. 11 is an external view showing one example of a mobile phone in which a conventional light emitting apparatus is installed.
Figure 12:
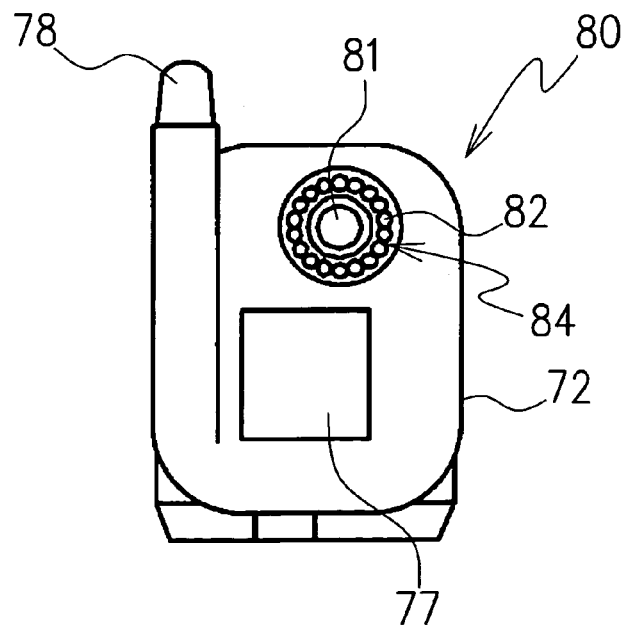
FIG. 12 is an external view showing another example of a mobile phone in which a conventional light emitting apparatus is installed.

FIG. 10 illustrates a third embodiment of the light emitting apparatus according to the present invention.

In the light emitting apparatus 30a in this embodiment, a planar lens portion 48 provided on the upper wall 38 of the frame 36 is substituted for the convex lens portion 43 in the second embodiment. Because other aspects of the structure are the same as in the second embodiment, identical reference numbers are attached to similar parts and a further detailed description thereof is omitted.

Here, the planar lens portion includes a relatively thinned flattened lens portion formed, for example, by a Fresnel lens surface.

In the light emitting apparatus 30a having the above-mentioned structure, the white light 25 emitted from the first light source 12 and the blue light 26 emitted from the second light source 13 enter a lower surface 48a of the planar lens portion 48 together, are condensed in the planar lens portion 48, and thereafter emitted from an upper surface 48b of the planar lens portion 48 to the exterior of the frame 36. In this way, even if the planar lens portion 48 is provided on the frame 36, the same advantageous effects as when the convex lens portion 43 being used can be obtained.

Although the case in which two white LEDs as first light sources 12 are disposed on the substrate 11 and two blue LEDs as second light sources are disposed on the substrate 11 has been mentioned in this embodiment, the present invention is not limited to LEDs emitting white light and blue light, and any combination of single-color LEDs of each of blue light, red light or green light may be used.

In addition, of course, a plurality of LEDs may be used as the first and second light sources in the first embodiment, and the second light source is not limited to a blue LED; an LED emitting a single color such as red or green may also be used.

Furthermore, in the above-mentioned embodiment, the first and second light sources are used as light sources emitting light of different colors, but the present invention is not limited to the two kinds of light sources.

Although the preferred embodiments of the present invention have been mentioned, the present invention is not limited to these embodiments, and various modifications and changes can be made to the embodiments.

What is claimed is:

1. An illumination apparatus having a light-transmitting frame, comprising:
    a substrate;
    a first light emitting diode and a second light emitting diode mounted on the substrate and configured to emit different colored lights, respectively; and
    a single light-transmitting frame comprising a side wall and an upper wall which form a concave portion, mounted on the substrate and configured to cover the first and the second light emitting diodes from above within the concave portion;
    wherein the upper wall of the light-transmitting frame includes an inside surface comprising a first light incident area and a second light incident area, each of the first and second light incident areas faces each one of the first and the second light emitting diodes, and an outside surface comprising a first light exit area configured to face the first light incident area and a second light exit area configured to surround the first light exit area, respectively, and further;
    wherein the inside surface of the upper wall of the light-transmitting frame has a stepped portion separating the first and the second light incident areas, the first light incident area is separated by the stepped portion to receive light emitted from the first light emitting diode and to pass the light through the upper wall of the light-transmitting frame at the first light exit area;
    wherein the second light incident area is separated by the stepped portion to receive light emitted from the second light emitting diode and to pass the light through the upper wall of the light-transmitting frame at the second light exit area, which is configured to surround the first light exit area.

2. The illumination apparatus having a light-transmitting frame according to claim 1,
    wherein at least one of the light exit areas has a lens portion.

3. The illumination apparatus having a light-transmitting frame according to claim 2,
    wherein one of the first and second light emitting diodes is configured to emit light flashes through the at least one of the light exit areas that has the lens portion.

4. The illumination apparatus having a light-transmitting frame according to claim 2,
    wherein the lens portion comprises one of a convex lens and a flat lens.

5. The illumination apparatus having a light-transmitting frame according to claim 1,
    wherein each of the first and second light emitting diodes is sealed by a separate resinous sealing body.

6. The illumination apparatus having a light-transmitting frame according to claim 1,
    wherein the first and second light emitting diodes are sealed together by a common resinous sealing body.

7. The illumination apparatus having a light-transmitting frame according to claim 1,
    wherein the first and second light emitting diodes include a light emitting diode to emit white light, and a light emitting diode to emit either blue light, red light or green light.

8. The illumination apparatus having a light-transmitting frame according to claim 1,
    wherein one of the first and second light emitting diodes is configured to emit light flashes and the other of the first and the second light emitting diodes is configured to emit indication light.

9. The illumination apparatus having a light-transmitting frame according to claim 1,
    wherein the substrate has a square shape and the frame has the same square shape in plan view.

10. The illumination apparatus having a light-transmitting frame according to claim 9,
    wherein the first light emitting diode is disposed adjacent to a central portion on the substrate.

11. The illumination apparatus having a light-transmitting frame according to claim 10,
    wherein the second light-transmitting diode is disposed on the substrate at a position other than the central portion.

* * * * *